United States Patent [19]

Wright

[11] Patent Number: 4,976,001

[45] Date of Patent: Dec. 11, 1990

[54] WIPER BLADES, SPRING ELEMENTS AND ARTICLES INCLUDING SUCH SPRING ELEMENTS

[75] Inventor: Charles W. Wright, Hough, England

[73] Assignee: Tamworth Plastics Limited, Apollo, England

[21] Appl. No.: 267,305

[22] Filed: Nov. 4, 1988

[30] Foreign Application Priority Data

Nov. 7, 1987 [GB] United Kingdom ............... 8726140

[51] Int. Cl.⁵ .................................. A47L 1/02
[52] U.S. Cl. ..................... 15/250.2; 15/250.36
[58] Field of Search ........... 15/250.06, 250.36, 250.42, 15/250.40, 250.2; 300/21

[56] References Cited

U.S. PATENT DOCUMENTS

| | | | |
|---|---|---|---|
| 190,236 | 3/1933 | Lindhe | 126/174 |
| 2,589,339 | 3/1952 | Carson | 15/250.40 |
| 2,677,143 | 5/1954 | Blaney | 15/250.06 |
| 2,797,428 | 7/1957 | Wallis | 15/250.36 |
| 3,131,414 | 5/1964 | Wise | 15/250.42 |
| 3,328,825 | 7/1967 | Anderson | 15/250.42 |
| 3,545,028 | 12/1970 | Poland | 15/250.36 |

FOREIGN PATENT DOCUMENTS

| | | |
|---|---|---|
| 546549 | 9/1985 | Australia . |
| 0233504 | 1/1987 | European Pat. Off. . |
| 1077540 | 3/1960 | Fed. Rep. of Germany . |
| 1247161 | 8/1967 | Fed. Rep. of Germany . |
| 1247162 | 8/1967 | Fed. Rep. of Germany . |
| 1430332 | 1/1969 | Fed. Rep. of Germany . |
| 2830118 | 1/1980 | Fed. Rep. of Germany . |
| 2839587 | 3/1980 | Fed. Rep. of Germany ... 15/250.12 |
| 820156 | 11/1937 | France . |
| 1476688 | 3/1967 | France . |
| 2404770 | 5/1974 | France . |
| 2437959 | 4/1980 | France . |
| 120587 | 6/1926 | Switzerland . |
| 222323 | 10/1924 | United Kingdom . |
| 887514 | 1/1962 | United Kingdom . |
| 1075927 | 7/1967 | United Kingdom . |
| 1425568 | 2/1976 | United Kingdom . |
| 1505232 | 3/1978 | United Kingdom . |
| 2127282 | 4/1984 | United Kingdom . |

OTHER PUBLICATIONS

German Publication-DE-U-74-17 777 (Mar. 27, 1975).
German Publication-DE-U-85' 22 017 (Jul. 31, 1985).
PCT Publication WO85/00207 (Jan. 17, 1985).

Primary Examiner—Frankie L. Stinson
Attorney, Agent, or Firm—Beveridge, DeGrandi & Weilacher

[57] ABSTRACT

A wiper blade, e.g. for a windscreen of a motor vehicle, comprises an elongate flexible spine from which projects a blade for wiping a surface. The spine has pairs of opposed abutment faces spaced apart along at least a part of the length of the spine and which move toward and away from each other with flexing of the spine. Resilient biasing means are interposed between the opposed abutment faces so that, in use, when the wiper blade engages a surface which causes the wiper blade to be deformed from its natural configuration, the resulting deformation of the resilient biasing means assists in holding the wiper blade against the surface.

The invention also concerns a spring element and articles, e.g. a door closure, including the spring element which comprises an elongate flexible member. Pairs of opposed abutment faces are spaced apart along at least a part of the length of the member and which move toward and away from each other with flexing of the member. Resilient biasing means are also interposed between said opposed abutment faces so that, in use, when the spring element is deformed from its natural configuration, the resulting deformation of the resilient biasing means assists in urging the spring element to return toward its natural configuration.

12 Claims, 10 Drawing Sheets

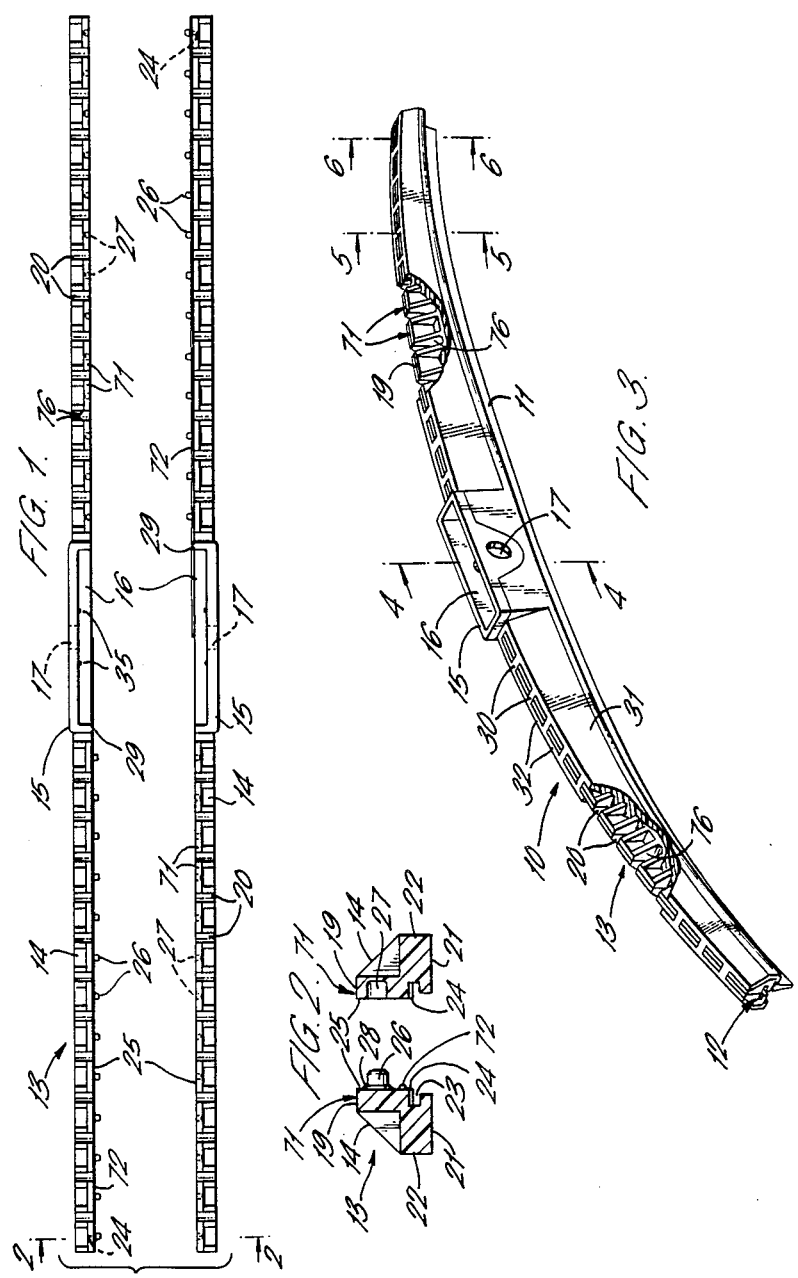

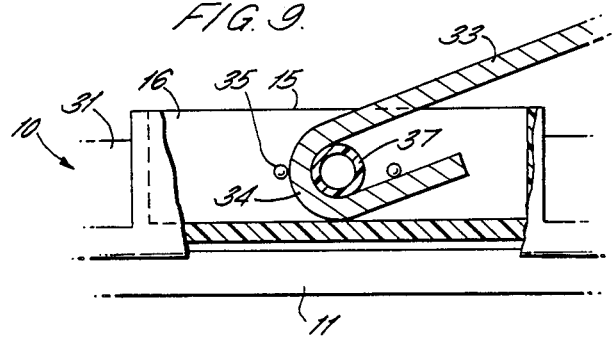
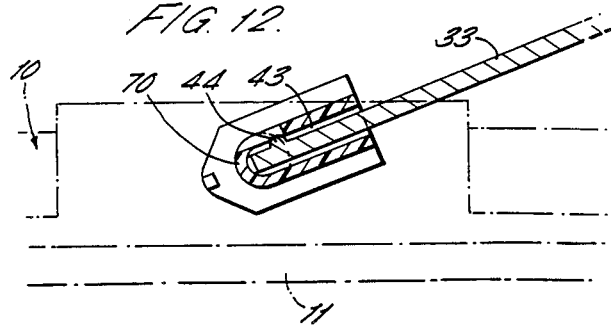
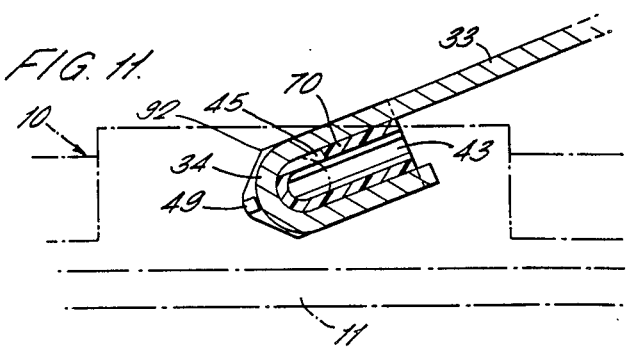

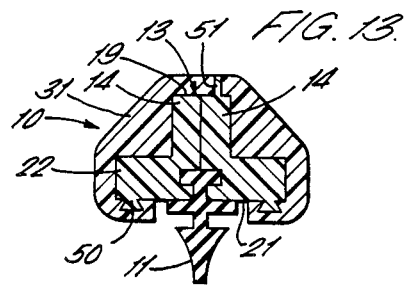
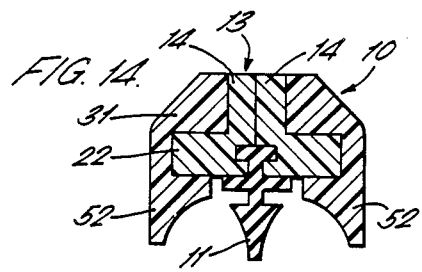
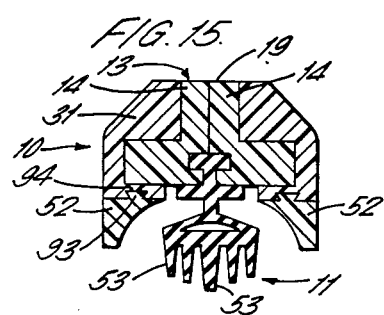
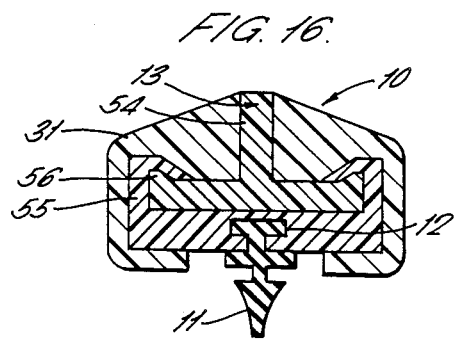

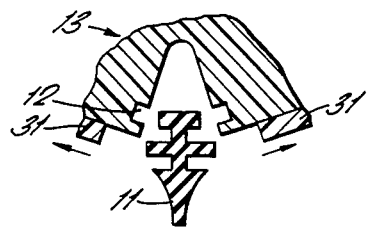
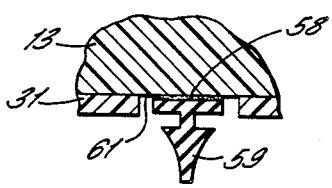
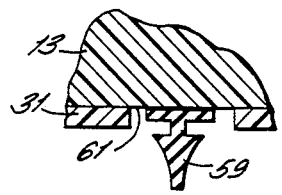
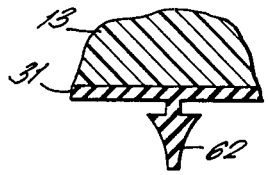
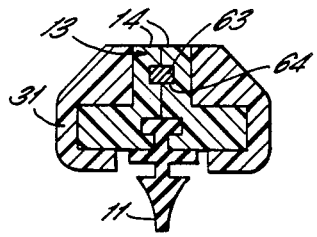
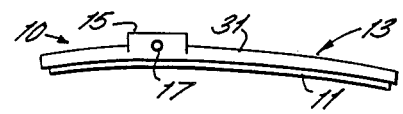
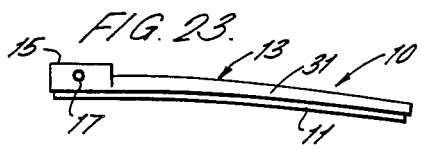

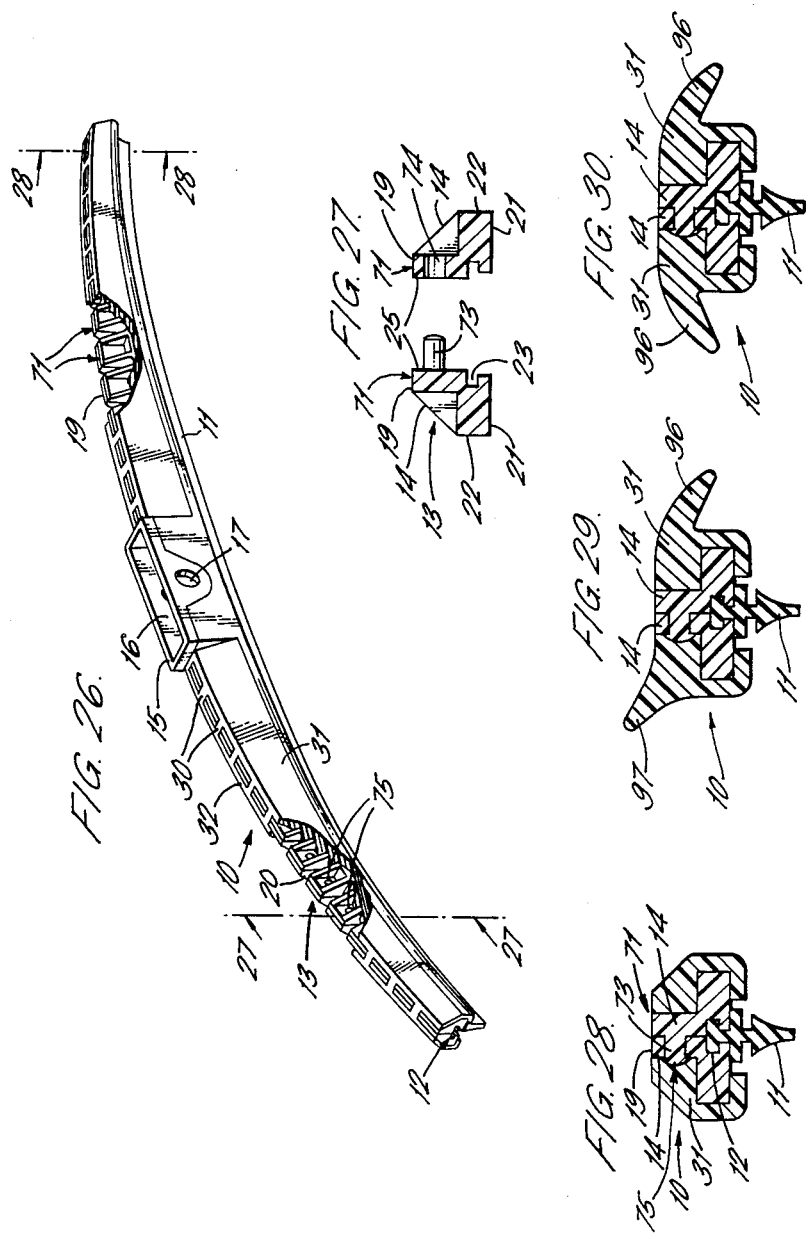

WIPER BLADES, SPRING ELEMENTS AND ARTICLES INCLUDING SUCH SPRING ELEMENTS

BACKGROUND OF THE INVENTION

1. Field of the Invention

This invention relates to wiper blades. More particularly, but not essentially, the invention relates to wiper blades for wiping surfaces of changing curvature, e.g. windscreens of vehicles whether a motor car, aeroplane, train or ship. However, the wiper blades are also applicable in other industries, for example the printing and food industries for wiping surfaces, and can be used for wiping surfaces which are curved or flat.

The invention also relates to spring elements and to articles including such spring elements.

2. Prior Art

Wiper blades of the type used for cleaning windscreens comprise a wiping blade, usually made as an extrusion or moulding of rubber or other resilient material, and a carrier for the wiping blade. It is important that the wiper blade conforms to the changing curvature of the windscreen surface through its movement range and to this end known carriers provide a multi-point mounting system for holding the wiping blade in a manner which allows the blade to change its curvature as it wipes over the windscreen surface. Most known carrier assemblies comprise a plurality of arcuate spring fingers or rockers pivoted intermediate their ends, which ends provide contact points with further fingers or rockers or with the wiping blade.

The known arrangement suffers from the disadvantage that there tend to be marked pressure points along the length of the wiping blade which can cause uneven wiping due to lower contact pressure between the blade and the windscreen at intermediate locations. Furthermore, the degree of curvature which can be accommodated by the known construction is limited and often results in lifting of the blade, especially at the ends where the screen is heavily curved.

A still further disadvantage of the known construction is that it utilises many components which have to be assembled together to form the carrier and then to which the wiping blade is fitted including a flexible metallic reinforcing strip for the wiping blade. Several components, often ten or more, are involved in a typical wiper blade and the time required for assembling them increases the cost of the wiper blade. Also, because of the number of components involved, the components of the wiper blade tend to freeze together in cold conditions, which restricts the ability of the wiper blade to conform to the change in curvature of the windscreen.

SUMMARY

According to the invention there is provided a wiper blade comprising an elongate flexible spine from which projects a blade for wiping a surface, wherein the spine has pairs of opposed abutment faces spaced apart along at least a part of the length of the spine and which move toward and away from each other with flexing of the spine, and resilient biasing means interposed between said opposed abutment faces so that, in use, when the wiper blade engages a surface which causes the wiper blade to be deformed from its natural configuration, the resulting deformation of the resilient biasing means assists in holding the wiper blade against the surface.

Preferably the pairs of opposed abutment faces are spaced along one side of the spine, and the wiping blade projects from the opposite side of the spine.

It is also preferred that there are a multiplicity of pairs of opposed abutment faces spaced along the spine.

In one particular construction according to the invention, along one side of the spine there are provided a multiplicity of substantially transverse grooves extending through the spine from face to face, the grooves forming said pairs of opposed abutment faces and containing said biasing means, and the wiping blade projecting from the opposite side of the spine.

The wiping blade may be attached to said opposite side of the spine. Alternatively, the wiping blade may conveniently be mounted in a T-shaped slot extending longitudinally of the spine.

The biasing means is preferably formed by a general encapsulation of the spine, which encapsulating material may be a resilient plastics material which is moulded onto the spine when the spine is held in a curved configuration and fills the spaces between said abutment faces. In one embodiment the spine and the biasing means are formed of such materials that the biasing material bonds to the spine material during the moulding process. In another embodiment the spine has means for mechanically keying the encapsulation thereto.

If desired, the wiping blade may be formed integrally with the general encapsulation of the spine.

The general encapsulation of the spine may include wiping aids extending longitudinally of the wiping blade on either side thereof. The wiping aids may be constructed separately from the general encapsulation which is provided with means for mounting the wiping aids removably thereon.

In one embodiment the general encapsulation of the spine has an aerodynamic shape which, in use at elevated speeds, creates a pressure on the wiper blade, said pressure acting to reduce the lifting effect on the wiper blade due to the velocity of the air, and thereby assisting the wiper blade to maintain contact with the surface being wiped.

In another embodiment the biasing means comprises at least one separately constructed strip having a series of resilient flanges which are interposed between said opposed abutment faces of the spine. Said biasing strip may be formed of plastics material and comprises an encapsulating cover for the associated length of the spine. Alternatively, said biasing strip may be a strip of spring steel having resilient elements which engage the respective pairs of opposed abutment faces. The resilient elements may be V-shaped, the legs of the V bearing against the respective abutment faces.

Means are preferably provided for mounting the wiper blade on a wiper arm.

The mounting means may comprise a pivot pin which is mounted in an aperture extending transversely through the spine and which acts as a pivotal connection between the wiper blade and the wiper arm. The pivot pin may be positioned substantially centrally along the length of the spine. Alternatively, the pivot pin may be positioned adjacent or at least nearer one end of the spine.

The pivot pin may be part of an adaptor for mounting the wiper arm offset relative to the spine. Preferably the adaptor includes a dual purpose mounting block having a curved outer surface for mounting a wiper arm with a turned back end and an inner cavity for mounting a straight ended wiper arm.

The wiping blade may have a multiplicity of longitudinally extending wiping surfaces arranged to provide a multi-wiping action in each direction.

A strengthening insert may extend internally of the spine along at least a part of its length.

Means may also extend internally of the spine, which means comprise heating means for the wiping blade.

The invention also provides a spring element comprising an elongate flexible member, wherein pairs of opposed abutment faces are spaced apart along at least a part of the length of the member and which move toward and away from each other with flexing of the member, and resilient biasing means interposed between said opposed abutment faces so that, in use, when the spring element is deformed from its natural configuration, the resulting deformation of the resilient biasing means assists in urging the spring element to return toward its natural configuration.

Preferably means are provided for mounting the spring element, which mounting means are disposed at at least one position at or intermediate the ends of the elongate member.

The invention further provides an article including such a spring element.

BRIEF DESCRIPTION OF THE DRAWINGS

FIG. 1 is a plan view, in exploded form, by way of example, of a spine acting as a carrier for a blade for wiping a surface;

FIG. 2 is an enlarged section along line 2—2 in FIG. 1;

FIG. 3 is a perspective view of a wiper blade, partly cut-away;

FIG. 9 shows, partly in section, the wiper blade of FIG. 3 mounted on the wiper arm of FIG. 7 by the mounting means of FIG. 7;

FIG. 11 shows, in section, the wiper arm of FIG. 7 mounted on the adaptor of FIG. 10;

FIG. 12 shows, in section, the further wiper arm illustrated in FIG. 10 mounted on the dual purpose adaptor of FIG. 10;

FIG. 13 shows, in section, a wiper blade having a modified encapsulation;

FIGS. 14 and 15 are sectional views of wiper blades having wiping aids;

FIG. 16 illustrates a modified construction of spine of a wiper blade;

FIGS. 17 to 19 illustrate, in section, modified ways of mounting a wiping blade;

FIG. 20 illustrates, in section, a wiper blade having a wiping blade which is moulded integrally with the encapsulation;

FIG. 21 shows, in section, a modified wiper blade having strengthening inserts;

FIGS. 22 and 23 illustrate different positions along the wiper blade for mounting the wiper blade on a wiper arm;

FIG. 26 is a perspective view of another modified wiper blade, partly cut-away;

FIG. 27 is an enlarged section along line 27—27 in FIG. 26, before the spine parts are assembled together;

FIG. 28 is an enlarged section along line 28—28 in FIG. 26, after the spine parts are joined together and encapsulated;

FIGS. 29 and 30 illustrate modified sectional views of the wiper blade of FIG. 26.

DESCRIPTION OF THE PREFERRED EMBODIMENTS

Figure 4:
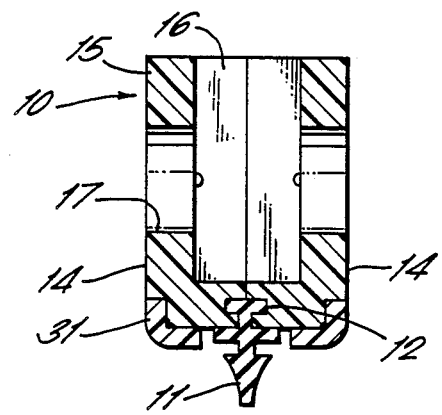
FIG. 4 is an enlarged section along line 4—4 in FIG. 3.
Figure 5:
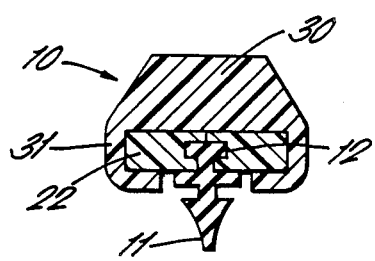
FIG. 5 is an enlarged section along line 5—5 in FIG. 3.
Figure 6:
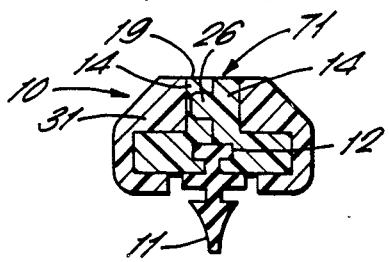
FIG. 6 is an enlarged section along line 6—6 in FIG. 3.

The embodiments of FIGS. 1 to 30 concern generally a wiper blade and various means for mounting the wiper blade onto a conventional wiper arm of a vehicle. However, it will be appreciated that the construction of wiper blade is suitable both for any type of vehicle, e.g. motor car, aircraft, train or ship, and also for use in the printing, food or any other industry in which wiper blades are used for wiping surfaces FIGS. 1 to 6 of the drawings illustrate a wiper blade 10 employing a conventional wiping blade 11 projecting from a T-shaped slot 12 extending longitudinally along a flexible elongate spine 13. In this embodiment, the spine 13 acts as a carrier for the wiping blade 11 and is an injection moulding of a nylon compound. Nylon is the preferred material for the spine because when formed it has a "memory", i.e. when it is flexed and then released it will return substantially to its natural configuration. Moulding the spine as one-piece would require a core member for the T-shaped slot which is capable of being extracted from the slot after removal of the spine from the mould. For this reason, in this embodiment, the spine 13 is formed of two identical moulded parts 14, one reversed in relation to the other (FIG. 1). Each spine part 14 has a central part 15 which together with the other central part forms a recessed portion 16 in the assembled wiper blade as a location point at which the wiper blade is mounted onto a wiper arm. Extending transversely through the central parts 15 of the two spine parts 14 are aligned holes 17 for reception of a mounting pin 18 (FIGS. 7 to 10). Also, within the central part of each spine part are two moulded stops 35 disposed one on either side of the respective hole 17. The purpose of these stops 35 is described below.

The upper surface 19 of each spine part 14, as illustrated, is tapered longitudinally between the central part 15 and each end whereby it becomes progressively thinner with respect to its lower surface in the direction extending from the central part to the respective end. On each side of the central part 15 of each spine part, there are provided a plurality of substantially transverse grooves 20 in the upper surface 19 extending through the width of the spine part from face to face and downwardly from the upper surface 19 to a constant depth relative to the lower surface 21 of the spine part. The grooves 20 form a series of abutments 71 spaced apart along the spine part 14. Accordingly, the spine part is castellated longitudinally on one side to provide pairs of opposed abutment faces 76 being the side walls of the grooves 20 extending upwardly, in this embodiment, from a continuous section 22 of constant thickness within which the respective half of the T-shaped slot 12 is formed as a shaped recess 23 therein. It will be appreciated that because the grooves 20 extend through the width of the respective spine part from face to face, the pair of opposed abutment faces 76 formed by each groove will move toward and away from each other with flexing of the spine part. Also, in this embodiment, within the recess 23 adjacent one or, as in this embodiment, both ends of the respective spine part, there is moulded a transverse rib 24 (FIG. 2) which, in use, acts as an end stop to prevent undesired longitudinal movement of the wiping blade within the slot 12 during reciprocal movement of the wiper blade. However, the end stops 24 do not prevent the wiping blade being threaded along the slot 12 to mount the wiping blade on the spine after the spine parts have been joined together and encapsulated as described below. The wiping blade 11 thus projects from the opposite side of the spine from the side in which the opposed abutment faces 76 are formed.

Also, in the inner surface 25 of each spine part, i.e. that surface which lies adjacent the other spine part when the two parts are assembled together edge to edge, there are provided between the grooves 20 a series of interfitting pegs 26 on one side of the central part 15 and corresponding sockets 27 on the other side of the central part 15. Thus the sockets 27 of each spine part provide location means for the pegs 26 of the other spine part during assembly of the spine, to ensure that the two spine parts are correctly aligned with respect to each other and that, in particular, the two recesses 23 are aligned to form the required T-shaped slot 12 for subsequent insertion of the wiping blade into the slot.

The interfitting pegs and sockets may effectively clip the two spine parts together. However, in this embodiment, the spine parts, after assembly, are welded together by ultrasonic welding. For this reason, each peg 26 has a web 28 (FIG. 2) at its base to act as an energy director which softens during the ultrasonic welding process and allows the peg to fit fully into its respective socket. Likewise, in order to achieve a positive weld at a position extending longitudinally of the spine between the bases of the grooves 20 and the T-shaped slot 12 below, each spine part has an energy director rib 72 (FIGS. 1 and 2) extending from one end of the spine to a point mid-way along the central part 15. Thereby when the two identical spine parts 14 are assembled, the weld will extend along the full length of the spine. Furthermore, to achieve a similar weld at each end of the central part 15, there is moulded on each spine part 14, at one end only of the central part, a vertical rib 29 (FIG. 1) which acts as an energy director at that position.

Thus to assemble the spine, the two spine parts 14 are assembled edge to edge with the pegs 26 of each spine part inserted into the sockets 27 of the other spine part. There is then a small gap between the two spine parts due to the presence of the energy directors 28, 29, 72. The assembled spine parts 14 are welded together by ultrasonic welding means which softens the energy directors thereby closing the gap and forming the spine parts into a unitary spine with the T-shaped slot 12 extending longitudinally of its lower surface 21. The mounting holes 17 in the central part 15 are also aligned one with the other.

It will be appreciated that the spine parts 14 may be assembled by other welding methods, besides ultrasonic welding, or by any other desired manner, e.g. an adhesive applicable to the material from which the spine is formed, or snap-fitting the spine parts 14 together.

Within the grooves 20 and thereby interposed between the pairs of opposed abutment faces 76, there are provided resilient biasing means 30 (FIG. 3). In this embodiment, the biasing means are at least generally under compression, longitudinally of the wiper blade, and act to maintain the spine 13 and hence the wiper blade 11 in a curved state, e.g. with the wiping blade convex relative to the surface to be wiped. In this embodiment, the biasing means 30 within each groove 20 are interconnected along each edge of the spine and formed as part of a general encapsulated coating 31 on the spine. Further, in this embodiment, the encapsulation 31 is formed of a compressible and resilient plastics material which is injection moulded onto the spine 13 when held in a curved state in a mould in a manner which opens out the grooves 20. The plastics material fills the grooves 20, whereby when the encapsulated spine is removed from the mould, the spine tries to return to its initial straight form and thereby puts the plastics material 30 within the grooves 20 generally under compression and the interconnecting portions 32 under tension longitudinally of the wiper. The configuration adopted by the encapsulated spine after its removal from the mould, which, in this embodiment, is curved (as shown in FIG. 3), may be deemed to be its natural configuration. Thereby, if the spine is deformed from this natural configuration by being flexed, the resulting deformation of the resilient encapsulating material assists in urging the spine to return toward its natural configuration.

During the encapsulation process, the spine 13 is held in the mould in a curved state by longitudinal contact between the interior surface of the mould and both the upper surface 19 and the central portion of the lower surface 21 of the spine. The encapsulating material 30 thus forms an encapsulation 31 which fills the grooves 20 and covers the edges of the spine and the edge portions of the lower surface of the spine. After removal of the spine from the mould, the wiping blade 11 is threaded along the slot 12 to mount the wiping blade on the spine and to complete the assembly of the wiper blade.

The plastics material employed for the biasing means 30 is preferably a thermoplastics rubber or a thermoplastics elastomer, both of which types of materials remain compressible and resilient for an acceptable period of time for use in the construction of a wiper blade. Examples of such materials are also commercially available which are adherent to nylon, under moulding conditions, or will adhere to the nylon spine if the spine is first dip coated in a suitable bonding agent to act as an adhesive. In each case, the bond between the thermoplastics rubber or the thermoplastics elastomer and the nylon spine may result in the biasing means 30 within the grooves 20 being under tension adjacent the side walls of the grooves. It will be appreciated that the compressive forces act against the tensile forces and the natural tendency for the spine to straighten itself, to maintain the wiper blade 10 in a curved form, and thereby to urge the wiping blade 11 to maintain contact with the surface being wiped throughout its length, whether the surface is curved or flat.

In practice, it is found that the multiplicity of grooves 20 containing respective biasing means 30 tends to create a series of pressure points and thus an evenness of pressure along the length of the wiping blade 11, which serves to assist the wiping blade to follow any varying contour of the surface to be wiped. Also, if the width or depth of a groove 20 is increased, the additional biasing force within the groove acts to increase the curvature of the wiper blade 10 but to reduce the pressure applied by the wiping blade 11. The positions of the grooves 20 and their widths and/or depths may thus be varied to achieve a desired result in any particular circumstance. However, by way of example, in this embodiment of a wiper blade for a motor vehicle, it is found that a satisfactory wiping action over a curved windscreen can be achieved by providing the spine 13 with grooves 20 having a width of 3 mm and being positioned at a constant pitch of 13 mm along the spine, and a depth of about 1.5 mm between the base of the grooves 20 and the top of the slot 12. Also, in the case of an encapsulation material which can achieve adhesion with the material of the spine, the minimum thickness along the edges of the spine is 1 mm.

Figure 7:
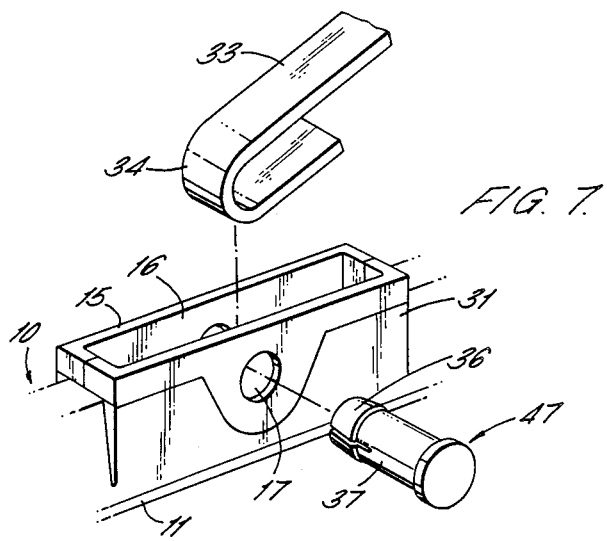
FIG. 7 shows, in exploded form, the means for mounting the wiper blade of FIG. 3 onto one embodiment of a wiper arm.
Figure 8:
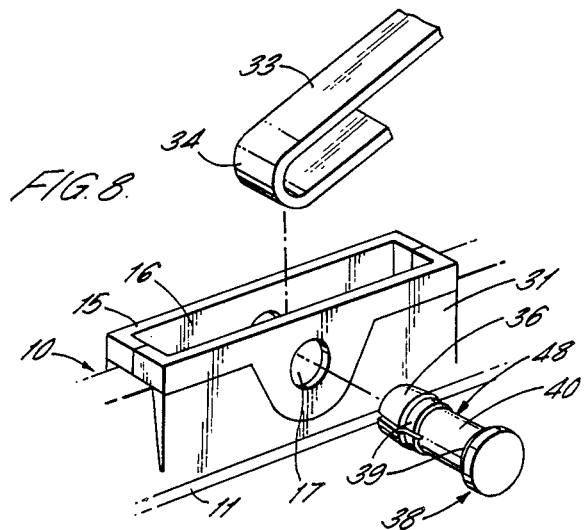
FIG. 8 shows a modification of the mounting means of FIG. 7 for another wiper arm.
Figure 10:
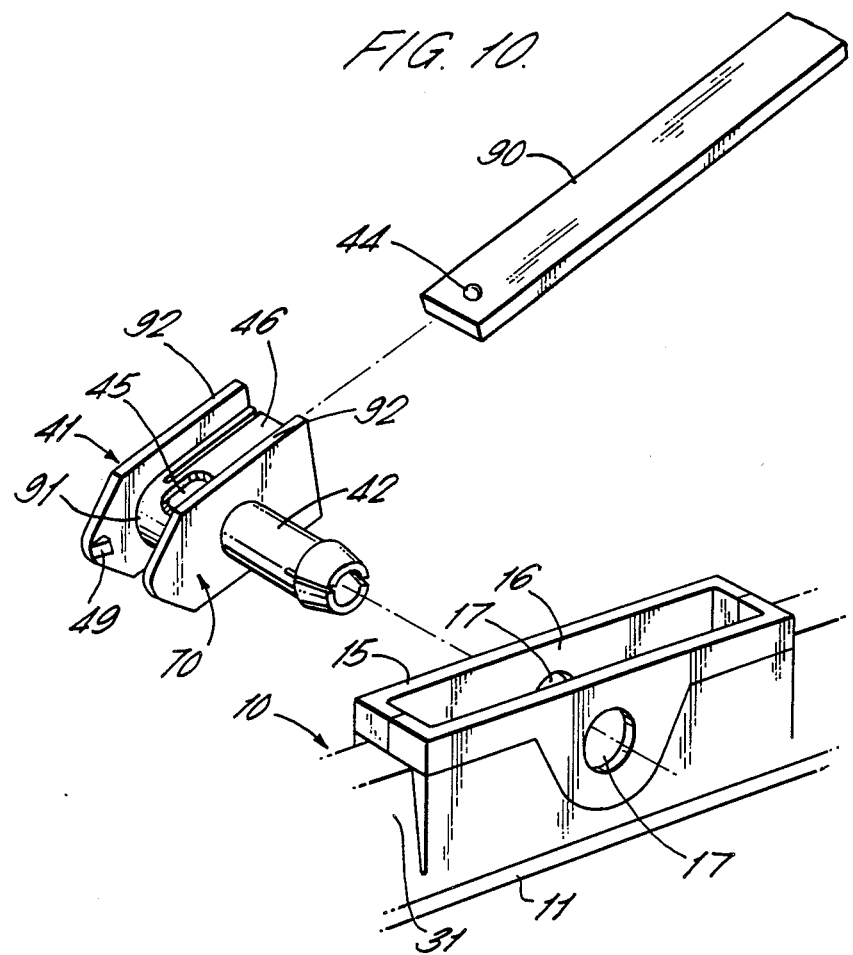
FIG. 10 illustrates a dual purpose adaptor for mounting the wiper arm of FIG. 7 or a further wiper arm in an offset position in relation to the wiper blade of FIG. 3.
Figure 24:
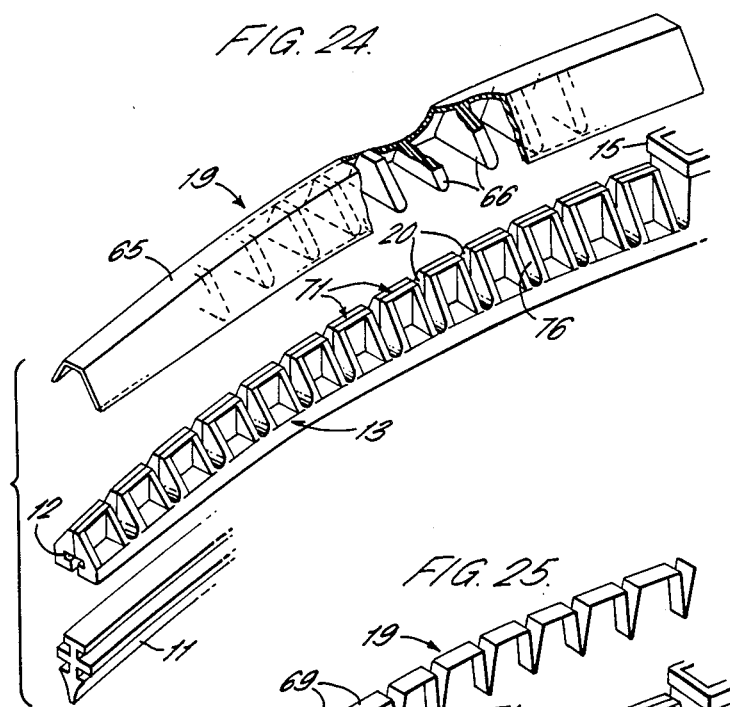
FIGS. 24 and 25 are perspective views, in exploded form, of modified wiper blades having the biasing means formed separately from the spine.

FIG. 7 shows a manner of mounting the wiper blade 10 on a wiper arm 33 having a turned back end 34 which is inserted into the central recessed portion 16 in the wiper blade. A headed pin 47 is inserted through the holes 17 and the turned back end 34 of the wiper arm 33 therebetween to hold the wiper arm, as shown in FIG. 9, locked between the pin and the abovementioned stops 35 moulded within the central recess. It will be appreciated that the wiper blade is reversible relative to the wiper arm. The end 36 of the pin 47 is enlarged relative to its shank 37, and is split to allow the pin to be inserted and then to lock itself on the other side of the wiper blade from the head of the pin. In the case of the mounting of the wiper blade shown in FIG. 7, the pin 47 has a shank of 8 mm which corresponds with the width of the gap of the turned back end 34 of the wiper arm 33. However, different vehicle manufacturers employ other wiper arms. For example, if the turned back end 34 has a gap width of 7 mm, there is provided (FIG. 8) a pin 38 having a shank 48 which is 8 mm at its ends 39 and has a central section 40 of 7 mm. The split end 36 allows the enlarged end of the pin 38 to be pushed through the smaller turned back end 34 of the wiper arm 33.

In other cases, the wiper blade 10 may be required to be mounted offset relative to the wiper arm 33. For this purpose, an adaptor 41 (FIG. 10) comprises a mounting block 70 and a mounting pin 42 for attachment to the central portion 16 of the wiper blade. In the case of the adaptor illustrated, a turned back wiper arm 33 having an 8 mm gap may be wrapped around a curved outer surface 91 disposed between side walls 92 of the mounting block 70 and held thereon by lug 49 (FIG. 11). Alternatively a straight wiper arm 90 may be inserted into a cavity 43 in the block 70 of the same adaptor 41 and locked therein by a detent 44 on the wiper arm engaging with a slot 45 in a tongue 46 of the mounting block (FIG. 12), thereby rendering the adaptor dual purpose.

Whilst maintaining the same general construction of wiper blade consisting of a castellated spine, wiping blade and biasing means, many different constructions are possible, of which a number are illustrated in the drawings and will be described below.

FIG. 13 shows an embodiment of wiper blade 10 in which the encapsulation material 31 does not adhere or only partially adheres to the material of the spine 13. In this case, the upper surface 19 of the spine except for the central part 15, is encapsulated and the encapsulation material 31 is mechanically keyed to the lower surface 21 of the spine by the provision of keys 50 protruding from the lower surface 21 and extending longitudinally of the spine.

During the encapsulation process it is preferred, as in the embodiment of FIGS. 1 to 6, that the spine 13 is positively held both from above and below, within the mould, whilst the encapsulation material is applied. For this reason, it is preferred to use an encapsulation material which will adhere adequately to the spine material and thereby avoid having to encapsulate the upper surface 19 of the spine. Alternatively, if it is found necessary to encapsulate the upper surface of the spine, the spine may be held from above at the position of the central part or, in addition, may be provided with a series of upstanding pins 51, as shown in FIG. 13, to act as anchoring points within the mould during the encapsulation process.

Another reason for not encapsulating the upper surface 19 of the spine 13 is that the exposed upper surface areas of the spine may be usefully colour coded.

In FIG. 14, the encapsulation material 31 is extended downwardly from the spine 13 to provide longitudinally extending skirt portions or wiping aids 52 for the wiping blade 11 to be disposed therebetween. Otherwise the wiper blade is identical to the wiper blade of FIGS. 1 to 6. The purpose of providing wiping aids 52 is for aerodynamic reasons so that the wiping blade 11 does not tend to lift off the surface being wiped, e.g. during movement of the vehicle at high speed. The provision of the wiping aids 52 also assists the action of the wiping blade, for example by removing larger objects such as globules of rain, snow, flies etc.

If desired, the wiping aids 52 may be formed as removable portions of the encapsulating material 31, see FIG. 15 described below.

Also, whether or not wiping aids are provided, the encapsulating material 31 and in particular the wiping blade 11 maY be spraYed with a known anti-slip coating, the object of which is to reduce any frictional resistance on the action of the wiping blade and to reduce the build up of dirt on the wiper blade. The coating could also be used to indicate when the wiping blade has become sufficiently worn to be in need of replacement, for example, when the coated surface has become dulled due to wear.

A further modification (FIG. 15) illustrates a variation of wiping blade 11 having a multiplicity of longitudinally extending wiping surfaces 53. The wiping surfaces may number two or more, five such surfaces 53 being shown in the illustrated embodiment in V-formation to provide a triple wipe in each direction of the wiper. In this embodiment, the wiper blade encapsulation 31 also has separately constructed wiping aids 52 which have longitudinally extending keys 93 for interfitting with grooves 94 in the underside of the encapsulation. The wiping aids may thus be fitted or removed, by a sliding action relative to the spine, as desired. Furthermore, in this case, the encapsulating material forms a bond with the spine material and hence the upper surface 19 of the spine 13 is not encapsulated.

In FIG. 16, there is shown a different construction of spine 13 having a T-shaped slot 12 for reception of a conventional wiping blade 11. In this embodiment, the spine is formed from a moulded upper part 54 providing the grooves 20 and central mounting part 15, and an extruded lower part 55 providing the T-shaped groove 12 for receiving the wiping blade 11. The spine 13 is assembled by clipping the extruded lower part over longitudinally extending lips 56 on the upper moulded part 54.

In another embodiment illustrated diagrammatically in FIG. 17, the spine 13 is flexible laterally on either side of the T-shaped slot 12 to open the slot to receive the upper portion of a conventional wiping blade 11 inserted from below, the spine then being released to allow the spine to return and hold the wiping blade in the slot.

In further embodiments, it is envisaged using special forms of wiping blade instead of a conventional wiping blade requiring a T-shaped mounting slot. For example, in FIG. 18, double-sided self-adhesive tape 58 is employed for mounting a wiping blade 59 onto the lower surface 61 of a spine 60. In FIG. 19, adhesive is used instead of adhesive tape 58.

In yet a further embodiment, FIG. 20, a wiping blade 62 is formed integrally with the encapsulation material 31 during the encapsulation process.

FIG. 21 shows a modified wiper blade 10 having on each side of the central mounting part 15 of the spine an insert 63 acting to stiffen and thereby strengthen the spine 13 over the length of the spine containing the insert, for example about half the length on either side of the central mounting part. Conveniently the insert 63 is a metal strip of any desired section, but preferably of rectangular section as illustrated, extending longitudinally within an internal slot 64 in the spine. In the case of the embodiment of FIGS. 1 to 6, the insert would be introduced into the slot 64 during assembly of the spine parts 14. It is found that, in use, if during part of the movement of the wiping blade 11 the ends are required to flex to a considerable degree, such flexing movement may tend to lift the central portion of the wiping blade 11 away from the surface being wiped. Such a tendency to lift the wiping blade may be prevented by the provision of the insert 63.

In an alternative embodiment, the insert 63, instead of being a strengthening insert may be formed as a heating element for connection to an electrical power source, and thereby act as means for heating the wiping blade 11 to prevent or reduce any tendency for the wiping blade to stick on the surface being wiped in cold conditions.

In each embodiment described above, the wiper blade has the central part 15 for mounting the wiper blade 10 on a wiper arm 33. However, if desired, the mounting part 15 may be disposed at a different position along the length of the wiper blade. For example, in the embodiment illustrated in FIG. 22, the mounting part 15 is at a position which is approximately one third along the length of the wiper blade. In another embodiment (FIG. 23), the mounting part 15 is at one end of the wiper blade. In both cases, the effectiveness of the wiper blade to remain in pressure contact with the surface being wiped is unaffected. Of course, it will be appreciated that, in each of these embodiments, if the spine is formed in two parts, they cannot be indentical, but are separate mouldings, one being generally, but not precisely, a mirror image of the other.

It has also been envisaged so far that the wiper blade is always of a finite length suited to its end use, for example of a length suitable for a particular surface to be wiped. However, it is possible to manufacture any of the above embodiments of wiper blade as a standard length component which is capable of being cut to length to suit its end purpose. In such a case, with reference to the wiper blade 10 of FIGS. 1 to 6, the moulded end stops 24 within the T-shaped slot 12 may be provided not only adjacent each end of the slot but at, e.g. 10 mm, intervals along the slot. Thereby, when the wiper blade is cut at one or both ends, as required, an end stop is present to resist undesired longitudinal movement of the wiping blade 11 relative to the spine 13. Indeed, it is not essential that each end of the wiping blade must butt against an end stop. The stop may be effective by creating a frictional force on the wiping blade within the slot. Alternatively, instead of moulded-in end stops, there may be provided at each end of the slot 12, a separately constructed stop which is pushed into the respective end of the slot after the wiper blade has been cut to length.

Another variation is to form the biasing means separately from the spine 13 of the wiper blade. For example, in the embodiment of FIG. 24, the biasing means comprises a pair of preformed, moulded strips 65 (only one of which is shown) of compressible and resilient plastics material, each strip acting as a cover for one half of the spine 13 and having a series of downwardly extending internal walls or flanges 66 for insertion into respective grooves 20 and thereby interposed between the pairs of opposed abutment faces 76 of the spine 13. To assemble the biasing means on the spine, the spine is first formed to a required convex curvature relative to the upper surface 19, e.g. by bending the spine around an appropriate template. Each biasing strip 65 is then inserted over its respective half of the spine with the flanges 66 of the biasing strip entering the opened out grooves 20 in the spine. On removal of the assembly from the template, the spine acts to try and straighten itself thereby reducing its curvature by the required extent and putting the flanges of the biasing strip under compression. A wiping blade 11 is then slid into and along the T-shaped slot 12 to complete the wiper blade. If desired, each biasing strip 65 may be fixed to the spine 13 by adhesive whilst the spine is on the template.

Figure 25:
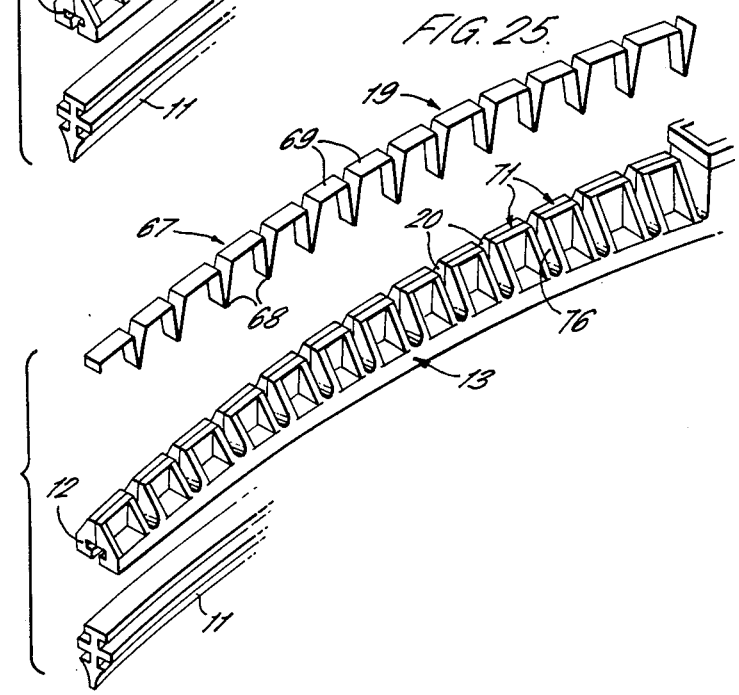

FIG. 25 illustrates a modified embodiment in which the biasing means is formed of spring steel strips 67 (again only one is shown), instead of plastics material. In this embodiment, each biasing strip is preformed to provide resilient elements or inserts 68 interconnected by straight portions 69, the elements engaging against the respective pairs of opposed abutment faces 76. In this embodiment, the elements 68 are V-shaped, the legs of the V bearing against the respective abutment faces. As before, the spine 13 is held curved in a manner which opens out the grooves 20, prior to the elements 68 of each biasing strip being pressed into the grooves 20 in the respective part of the spine.

The embodiment of FIGS. 26 to 28 is generally similar to the embodiment of FIGS. 1 to 6. The essential difference is that the nylon spine parts 14 are joined together by heat-staking instead of by ultrasonic welding. For this purpose, each spine part 14 is moulded with sockets 74 which extend through the walls of their respective abutments 71 and longer pegs 73 which, on assembly of the spine parts 14 (FIG. 28), project through the associated abutment of the other spine part. The energy directors 28, 29 and 72 required previously to obtain an ultrasonic weld are omitted.

As before, the identical spine parts 14 are assembled in correct location by inserting the pegs 73 of each spine part into the sockets or through holes 74 in the other spine part, each peg projecting through the associated abutment 71 of the other spine part. The spine parts are then joined together by heat-staking which acts to rivet over the protruding ends 75 of the pegs 73. Thereafter the wiper blade is encapsulated in a thermoplastics rubber or a thermoplastics elastomer material to form the biasing means 30 in the same manner as in the embodiment of FIGS. 1 to 6. Finally the wiping blade 11 is inserted into the T-shaped slot 12.

In each embodiment of wiper blade described above, the external shape of the encapsulation 31 includes chamfered longitudinal edges on the opposite side of the wiper blade from the wiping blade 11. In use, this shaping of the encapsulation causes an air pressure to be exerted on the wiper blade which acts to reduce the lifting effect on the wiper blade due to the velocity of the air, and thereby assists the wiper blade to maintain contact with the surface being wiped. The lifting effect may be further reduced by providing the encapsulation 31 with an aerodynamic shape, which is particularly beneficial at elevated speeds.

FIG. 29 illustrates an aerodynamic shape which on one face of the spine has a laterally extending portion 96 which is generally directed downwardly towards the surface to be wiped, and on the other face of the spine has a laterally extending portion 97 which is generally directed upwardly away from the surface to be wiped. In this embodiment, both portions 96, 97 extend longitudinally along the full length of the wiper blade except for the central part 15. Alternatively, each portion 96,97 may extend along only a selected section of the length of the wiper blade, i.e. disposed where it is desired to counteract the lifting effect, or may be discontinuous along the length of the wiper blade. In practice, the wiper blade is fitted so that when the wiper blade is moving, for example, from a substantially horizontal parked position towards a substantially vertical position, the downwardly directed portion 96 is on the trailing face of the wiper blade.

FIG. 30 illustrates another aerodynamic shape in which a laterally extending portion 96 on each face of the spine is generally directed downwardly towards the surface to be wiped. As before, each portion 96 may extend over the whole length of the spine or along one or more sections of its length. However, in this embodiment, the wiper blade is reversible. The aerodynamic shape of this embodiment is also more suitable for use in a situation in which the wiper blade moves a considerable distance past the vertical.

If desired, an aerodynamic shape may be created on a wiper blade which is otherwise in accordance with one of the embodiments of FIGS. 1 to 28. For example, a separately constructed fitting having the required aerodynamic shape, e.g. as shown in FIG. 29 or FIG. 30, may be clipped onto the wiper blade, or otherwise attached thereto, at one or more positions along its length.

It will be appreciated that the biasing means in the grooves between opposed abutment faces along the spine need not be interconnected. Independent biasing means could be inserted into each groove.

Also, in some circumstances, the abutments of the spine may be spaced apart at a varying pitch over at least one part of the length of the spine, e.g. adjacent one end of the spine, instead of being at an even pitch throughout its length. Thereby it is possible to modify the spring characteristic of the wiper blade over that one part of its length, relative to the remainder of the wiper blade. A similar variable spring characteristic may be effected by providing grooves 20 of different depths and/or widths, as required, along the length of the spine.

Indeed, in a modified embodiment, the abutments and associated biasing means may extend over a part or parts only of the length of the spine, not throughout its length as in the embodiments described above. For example, if, in use, only one end of the wiper blade is required to follow a varying curvature of the surface being wiped, then it may be sufficient to provide opposed abutment faces and associated biasing means only at that end of the spine. However, in a case in which the biasing means is formed by encapsulating the spine, the encapsulation may still extend over the full length of the spine.

Furthermore the materials employed for the spine and the biasing means may be chosen to provide the required flexibility of the spine and the required resilience in the biasing means to result in the wiping blade maintaining pressure contact on the surface being wiped throughout its length.

One advantage of the wiper blades described above is that they have less components than conventional multi-component wiper blades and are easier to assemble thereby rendering them more economical to produce.

Another advantage is that the wiper blades can follow a changing curvature more accurately and provide a more even contact pressure throughout the length of the wiping blade.

Figure 31:
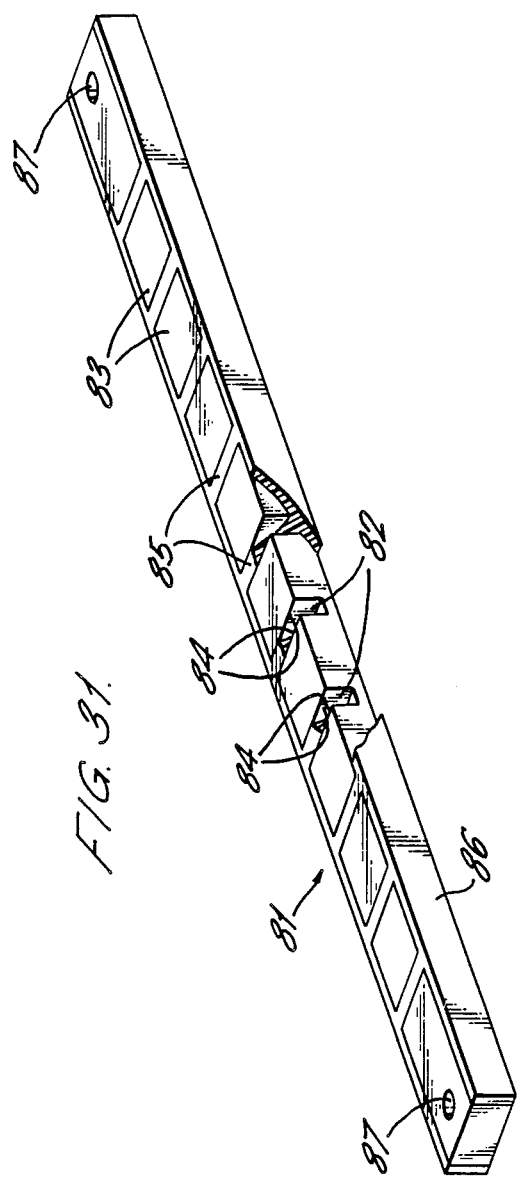
FIG. 31 is a perspective view of a spring element, partly cut-away.

The principal of the invention may also be extended beyond wiper blades to spring elements generally and articles including such spring elements. By way of example, FIG. 31 illustrates a basic spring element 80 comprising an elongate flexible member 81, e.g. of rectangular cross-section as shown and formed of nylon. One side of the member 81 is castellated by the provision of a multiplicity of substantially transverse grooves 82 extending across the width of the member from face to face and forming abutments 83 therebetween. The walls of each groove 82 thereby comprise a pair of opposed abutment faces 84 which move toward and away from each other with flexing of the member. The castellation of the member 81 may extend along substantially the whole of the length of the member, as shown, or along only part of its length, e.g. in the middle portion or toward one end of the member. Thereby the location of the spring effect applied to the member 81 may be varied along its length, as required.

As in the case of the wiper blade, each groove 82 is filled with resilient biasing means 85. In this embodiment, the biasing means are part of a general encapsulation 86 of a thermoplastics rubber or a thermoplastics elastomer material which is moulded onto the nylon member 81 to fill the grooves and extend along the edges of the member, preferably forming a bond with the nylon member. Alternatively, the biasing means may be at least one separately constructed member which is assembled with the member in a similar manner to the embodiments of FIGS. 24 and 25. The spring element may be formed with the member 81 straight, as illustrated, or curved, i.e. convex or concave, or as a continuous ring, depending on the intended use of the spring element.

Mounting means for the member 81 may be provided at one or more positions along its length. In this embodiment there is provided a hole 87 adjacent each end of the member for securing the member, e.g. by bolts.

The materials employed for the member 81 and the biasing means 85 may be varied depending on the intended use of the spring element. One such use may be as a door closure. In this case, the spring element may be secured at one end to the door frame and, if desired, secured at the other end to the door. Another possible use is as a leaf spring, the resilient biasing means acting to modify the spring characteristic. In each case, when the spring element 81 is deformed from its natural configuration, whether curved or straight, the resulting deformation of the resilient biasing means assists in urging the spring element to return toward its natural configuration.

We claim

1. A wiper blade assembly comprising an elongate flexible spine from which projects an elongate blade extending along the length of the spine for wiping a surface, wherein the spine has a number of pairs of opposed abutment faces spaced apart along at least a part of the length of the spine and which move toward and away from each other with flexing of the spine, and resilient biasing means interposed between said opposed abutment faces, said spine and blade, with said resilient biasing means interposed between said abutment faces, having a curved configuration when said spine and blade are not subjected to any external force, and said spine having an inherent tendency to return to a less curved state whereby said biasing means is in a precompressed state when said wiper blade assembly is not subjected to any external force, and said biasing means resisting a reduction in curvature of the spine and blade so that when the blade assembly is pressed towards a surface of lesser curvature, the resultant stressing of the biasing means holds the blade against the surface.

2. A wiper blade assembly as claimed in claim 1, wherein the pairs of opposed abutment faces are spaced along one side of the spine, and the wiping blade projects from the opposite side of the spine.

3. A wiper blade assembly as claimed in claim 2, wherein the wiping blade is attached to said opposite side of the spine.

4. A wiper blade assembly as claimed in claim 1, wherein there are multiplicity of pairs of opposed abutment faces spaced along the spine whereby when the blade assembly is pressed towards a surface of lesser curvature, the resultant stressing of the biasing means between the opposed abutment faces distributes pressure acting towards the surface along the length of the assembly.

5. A wiper blade assembly as claimed in claim 1, wherein along one side of the spine there are provided a multiplicity of substantially transverse grooves extending through the spine from face to face, the grooves forming said pairs of opposed abutment faces and containing said biasing means, and the wiping blade projecting from the opposite side of the spine.

6. A wiper blade assembly as claimed in claim 5, wherein the wiping blade is mounted in a T-shaped slot extending longitudinally of the spine.

7. A wiper blade assembly as claimed in claim 6, wherein the spine is formed of two parts disposed edge to edge and joined together longitudinally of the spine, a shaped recess being formed in the lower surface of each spine part, which recesses combine to form the T-shaped slot for mounting the wiping blade.

8. A wiper blade assembly as claimed in claim 1, wherein the biasing means is formed by a general encapsulation of the spine.

9. A wiper blade assembly as claimed in claim 8, wherein the encapsulating material is a resilient plastics material which is moulded onto the spine when the spine is held in a curved configuration and fills the spaces between said abutment faces.

10. A wiper blade assembly as claimed in claim 8, wherein the spine and the biasing means are formed of such materials that the biasing material bonds to the spine material during the encapsulating process.

11. A wiper blade assembly comprising an elongate flexible spine from which projects a blade for wiping a surface, wherein the spine is formed of two parts disposed edge to edge and joined together longitudinally of the spine, a shaped recess being formed in the lower surface of each spine part, which recesses combine to form a T-shaped slot extending longitudinally of the spine, the wiping blade being mounted in the T-shaped slot, and the spine having pairs of opposed abutment faces spaced apart along at least a part of the length of the spine and which more toward and away from each other with flexing of the spine, and resilient biasing means interposed between said opposed abutment faces so that, in use, when the wiping blade engages a surface which causes the wiper blade to be deformed from its natural configuration the resulting deformation of the resilient biasing means assists in holding the wiping blade against the surface.

12. A wiper blade assembly comprising an elongate flexible spine having a continuous lower portion extending along the length of the spine, a number of abutments formed along at least a part of the length of the upper portion of the spine, the abutments being spaced apart to provide pairs of opposed abutment faces which move toward any away from each other with flexing of the spine, and resilient biasing means interposed between said opposed abutment faces, and an elongate blade extending along the length of the lower portion of the spine for wiping a surface, said blade thereby projecting from the spine on the opposite side from the side in which the opposed abutment faces are formed, said spine and blade assembly, with said resilient biasing means interposed between said abutment faces, having a curved configuration when said spine and blade are not subjected to any external force, the lower portion of said spine maintaining the blade in said curved configuration and said biasing means being separate and distinct from said blade, and said biasing means resisting a reduction in curvature of the spine and blade so that when the blade assembly is pressed by an external force towards a surface of lesser curvature, the resultant stressing of the biasing means distributes the external force along at least said part of the length of the assembly thereby holding the blade against the surface.

* * * * *